United States Patent [19]

Northrop

[11] Patent Number: 4,721,569
[45] Date of Patent: Jan. 26, 1988

[54] PHOSPHORUS TREATMENT PROCESS

[75] Inventor: Jere Northrop, North Tonawanda, N.Y.

[73] Assignee: Zabion, Ltd., North Tonawanda, N.Y.

[21] Appl. No.: 39,969

[22] Filed: Apr. 17, 1987

[51] Int. Cl.$^4$ ................................................ C02F 3/30
[52] U.S. Cl. ....................................... 210/607; 210/622; 210/630; 210/903
[58] Field of Search ............... 210/605, 607, 609, 610, 210/622–626, 630, 631, 906, 611

[56] References Cited

U.S. PATENT DOCUMENTS

| | | | |
|---|---|---|---|
| 4,279,753 | 7/1981 | Nielson et al. | 210/605 |
| 4,431,543 | 2/1984 | Matsuo et al. | 210/607 X |
| 4,460,470 | 7/1984 | Reimann | 210/605 |
| 4,488,968 | 12/1984 | Hong et al. | 210/605 |
| 4,522,722 | 6/1985 | Nicholas | 210/605 |
| 4,559,142 | 12/1985 | Morper | 210/607 |

*Primary Examiner*—Tom Wyse
*Attorney, Agent, or Firm*—William J. Crossetta

[57] ABSTRACT

A process is disclosed for decreasing the phosphorus content of an aqueous influent stream containing biodegradable substrates, comprising adding to said stream previous aerobically enhanced and anaerobically stressed bacteria; dividing said stream into separate first and second streams; treating the first stream in an aerobic zone, in the presence of sufficient oxygen, for a time sufficient to cause enhancement of the bacteria to take-up phosphorus in excess of their growth requirements; treating the second stream in an anaerobic zone containing less than about 1 ppm of oxygen, for a time sufficient to stress the bacteria and cause release of phosphorus which is nonessential for the bacteria growth requirements; intimately mixing said treated first and second stream; holding said mixed first and second streams to allow settling of precipitants; removing liquid effluent from the upper portion of the settled stream; removing high solids content sludge, containing bacteria and phosphorus from the lower portion of the settled stream; and, recycling a portion of sludge containing bacteria to the aqueous influent stream. Such process acts to synergistically increase the efficiency of phosphorus removal, without addition of costly chemicals, by significantly increasing the amount of phosphorus taken-up by bacteria.

15 Claims, 1 Drawing Figure

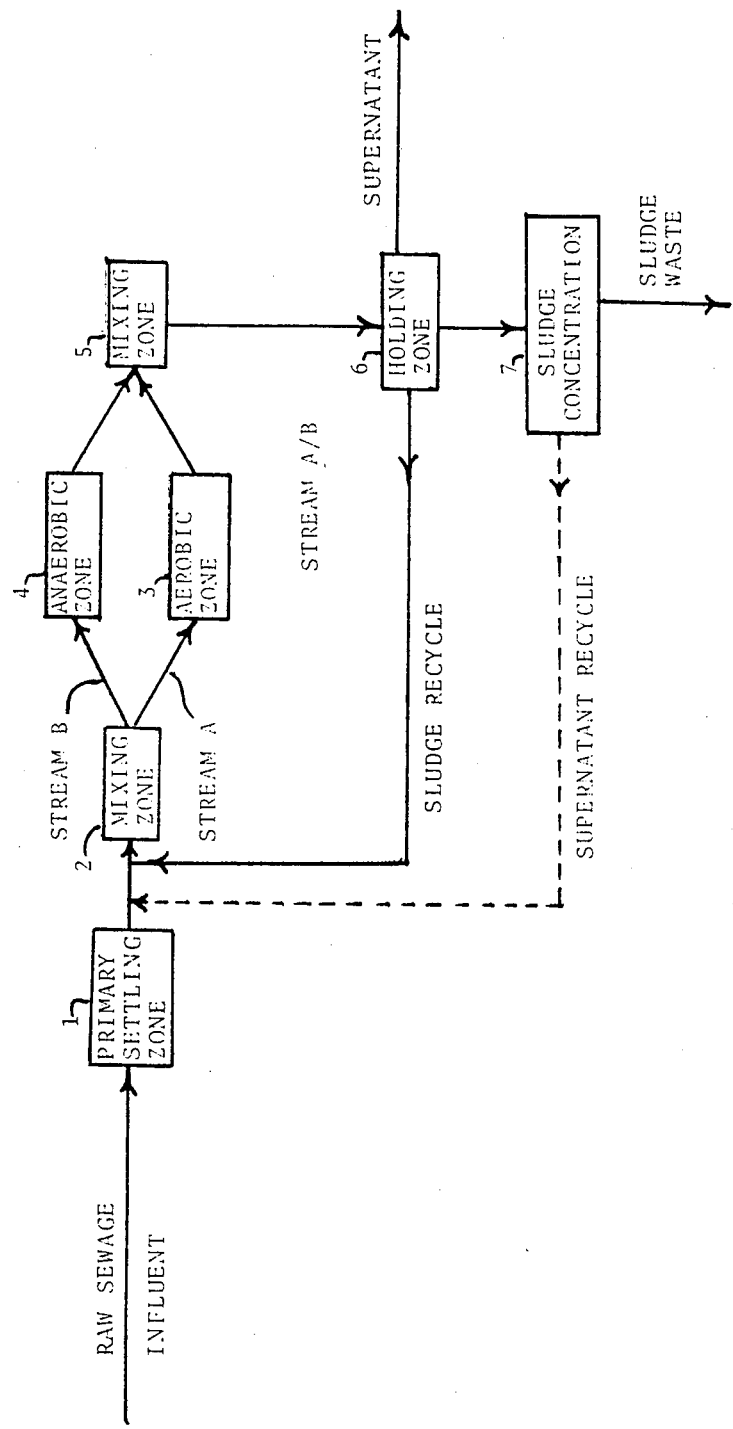

PHOSPHORUS TREATMENT PROCESS

This invention relates to a novel process for treating phosphorus containing aqueous streams, particularly raw or primary treated sewage streams, to obtain a substantially phosphorus free effluent.

BACKGROUND OF THE INVENTION

The removal of phosphorus from effluent streams has taken on increasing importance in one modern world. The effect of phosphorus in waste sewage on the lakes and streams into which such sewage flows has been so serious that its removal has been a mandated requirement by multiple governmental authorities. When certain forms of phosphorus are present in lakes, rivers and streams, there is a significant increase in the growth of unwanted bacteria, algae and vegetation; which in turn acts to severely restrict the use that can be made of such waters, and can act to render such water useless, or, can deteriorate the health of man and his environment.

Many processes have been proposed for the removal of phosphorus from waste streams but most have been found to be either too ineffective, or to be too costly to be cost effective. Presently, the most frequently employed method of phosphorus removal is by precipitants. This process is achieved by the addition of metal oxides such as calcium, magnesium and sodium aluminate or by the addition of metal salts, such as chlorides and sulfates of aluminum and iron to the waste stream. Such chemicals can be added at various stages of the treatment process and have been found effective, but not without significant expense and the creation of additional problems.

The metal oxides typically used in such precipitant systems are strongly alkaline and effect a change in pH to the waste stream which may interfere with other processing functions or steps and often requires further treatment before returning such treated stream to the environment. Regulation of pH frequently requires additional equipment, sophisticated controls, further chemical treatment and additional operator attention. The metal salts also create problems in that they are typically strongly acidic. Dealing with them involves problems comparable to those resulting from the use of metal oxides except that an acid condition must be controlled. Additionally, the use of these chemicals requires accurate proportioning of chemical dosages to influent phosphorus loadings for efficient use of the chemicals. Sophisticated controls and/or continuing operator maintainance is required for efficient operation of such precipitant systems.

The use of the chemical precipitant method adds substantially to the cost of water treatment and increases the amount of sludge that must thereafter be disposed of. The precipitate formed in the use of metal salts is voluminous and does not compact well by the usual means employed. Consequently, the more metal salt used the greater the volume of sludge created. The use of metal oxides typically result in a cation contaminated effluent which remains in solution and can present a removal problem that eventually may be mandated for removal by governmental authority.

A promising, but less frequently employed method of phosphorus treatment comprises what is commonly known as the activated sludge process. In such process, biological growth colonies are typically developed in the waste water stream through treatment in the presence of oxygen. A biologically active sludge is thus formed which is recycled to the influent for biochemical reaction with the organisms in the influent to create bioprecipitation, adsorption, absorption and aqueous oxidation. The active microorganisms are periodically or continuously introduced to the reactor. Though such process appears at first glance to be an inexpensive and highly desirable means of removing phosphorus, the activated sludge process of the prior art have, in practice, been less efficient than desired and have required significant additions of precipitate to assure that a clear, substantially phosphorus free effluent, is attained. The low level of efficiency can be directly attributed to the limited phosphorus uptake by the bacteria in the waste stream being treated. By far, the most expensive element of an activated sludge process occurs when additional precipitating chemicals are required and it is not atypical that an activated sludge system may require the use of 50% or more of the chemical precipitant necessary in a phosphorus precipitation process, to obtain an acceptable phosphorus free effluent level.

One object of the instant invention is to improve the efficiency of the activated sludge process to attain greater phosphorus removal without the use of precipitants. Another object of the invention is to reduce the chemical cost of treating phosphorus containing sewage. A further object is to treat phosphorus containing sewage in such a manner which allows creation of an easily compactable sludge to reduce land fill requirements. These and other objects will be apparent from the following disclosure of the invention.

SUMMARY OF THE INVENTION

The invention generally comprises a method for removing phosphorus from waste water by intimately mixing and interacting streams which have been separately exposed to conflicting processing conditions. Such separate exposure and recombination of process streams which have been subjected to conflicting conditions results in an increased phosphorus take-up by the bacteria present in the combined stream and thus acts to provide a higher degree of phosphorus removal than typically experienced in an activated sludge treatment process. I have found, that as a result of the imposition of appropriate conflicting conditions on a process stream, that in most instances, no further chemical treatment need be applied to the system to attain efficient discharge falling well within regulatory standards. In situations where further chemical treatment is necessary, the amount of chemicals utilized is relatively low and within easily manageable levels.

DISCLOSURE OF THE INVENTION

I have found that a substantially phosphorus free effluent can be attained from an aqueous phosphorus containing stream by a relatively simple process, which exposes the stream to conflicting process conditions in such a manner as to cause bacteria contained therein to take-up and then precipitate the phosphorus in greater efficiency than previously thought possible. In my process an aqueous influent stream containing previously stressed and enhanced bacteria, phosphorus and biodegradable substances is divided into separate streams which are concurrently aerobically and anaerobically treated. The separately treated streams are then combined in intimate mixture and phosphorus containing bacteria are allowed to settle out. It is essential to the process that at least a portion of the enhanced bacteria contained in the combined stream be recycled to the incoming influent to assure high process efficiency.

Though I wish not to be bound by the following, I believe that when bacteria are initially subjected to an anaerobic zone they tend to take-up only a small amount of the total free phosphorus that might be available in the process stream. I have found that for some reason, when bacteria are exposed to alternate aerobic, anaerobic, aerobic and anaerobic conditions that the amount of free phosphorus taken-up in the second aerobic zone is much higher (enhanced) than that taken-up in the first aerobic zone. I believe that this is because the bacteria anticipate the recurrence of anaerobic stress and as a result seek to protect themselves from such stress by creating a larger energy sump in the form of phosphorus entrained. If the alternating aerobic, anaerobic, aerobic and anaerobic conditions are removed, the bacteria will generally lose the capacity to anticipate conditions and consequently will no longer take-up the extra phosphorus to create a phosphorus rich condition.

Thus, I have developed a process which seeks to maximize the anticipation of stress in bacteria, which in turn maximizes the uptake of phosphorus by the bacteria, putting the phosphorus into a form in which it can be easily removed from a process stream. To this end, I propose that to an incoming phosphorus containing stream there be added previously anaerobically stressed and aerobically enhanced bacteria. The stressed and enhanced bacteria is intimately mixed into the influent stream and provides a basis for anticipation by subsequent generated bacteria. The mixed stream is divided into at least two separate streams for separate treatment. At least one of the separate streams is treated in an aerobic zone, in the presence of sufficient oxygen, for a time sufficient to enhance the bacteria contained in the stream, to take-up free phosphorus in excess of their life support requirements. Another of the separate streams is concurrently treated in an anaerobic zone, under oxygen deficient conditions, for a time sufficient to stress the bacteria contained therein and cause release of phosphorus held by the bacteria. The relatively oxygen rich, but free-phosphorus deprived stream coming from the aerobic zone in then intimately mixed with the free-phosphorus rich, but oxygen depleted, stream coming from the anaerobic zone with the result being a rapid free-phosphorus takeup by the anaerobic treated bacteria in excess of its aerobically enhanced requirements. The system will tend toward a steady state and the already phosphorus-rich bacteria (aerobically enhanced), coming from the aerobic zone, will compete with the anaerobically stressed bacteria for the free phosphorus and the result will be a steady state system with entrained phosphorus at a higher level than normally aerobically enhanced.

The thus high efficiency entrained phosphorus stream is then held in a quiescent state to allow the settling of the phosphorus enriched bacteria. The heavy sludge portion is removed for solid waste treatment or can be in part recycled. The supernatant is generally clear and may be discharged without further treatment.

Generally, a high degree a mixing is necessary when combining the separate streams which have been concurrently anaerobically and aerobically treated. I feel that an adequate degree of mixing can be attained by utilizing an appropriate static mixer such as subsurface aeration, weirs, baffles and venturi type mixers. Generally, I prefer to utilize an aerating mixing means as it provides an additional aerobic treatment which can act to further increase the phosphorus uptake efficiency. Active mixing is generally the most convenient method and can also act to provide additional aerobic treatment by assuring distribution of entained oxygen. Multiple active mixers have been found suitable, including surface and subsurface, impeller mixers, shakers and the like. The most preferred mixing system comprises an active impeller mixer with aeration capacity.

The anaerobic zone can comprise a separate vessel, channel, pipe or the like and can be static or can comprise a flowing stream. It is preferred that an active current of some nature be maintained in the anaerobic zone to minimize settling of bacteria. Such current can be maintained by stream flow through the anaerobic zone, hydraulic turbulance, shaking, intermittant mixing and the like. A primary requirement in the anaerobic zone is the maintaining of a relatively oxygen free environment. For maximum efficiency of the process of the invention the anaerobic zone should contain less than approximately 1 ppm oxygen. For most purposes of my invention, I have found a closed vessel, with mechanical mixing means, to be a preferred anaerobic apparatus to achieve the objects of this invention.

The aerobic zone, as with the anaerobic zone, can comprise a separate vessel, channel, pipes and the like and can be static or can comprise a flowing stream. As with the anaerobic zone, a potential exists for the settling of phosphorus rich bacteria and it is desirable to maintain some aqueous current in the stream being treated. Equipment as previously described in the anaerobic zone can be effectively utilized for this purpose. A primary requirement of aerobic treatment is the maintaining of an oxygen rich environment and I find it preferable to maintain at least about 2 ppm and preferably more of oxygen to attain efficient phosphorus uptake. I find the most preferred level of environmental oxygen to be from about 3 or more ppm oxygen up to about saturation.

Generally the influent stream will contain adequate bacteria and biodegradable substrates to allow initiation of the process, but to attain efficient levels of phosphorus removal, recycling of previously stressed and enhanced bacteria generated in the aerobic zone by the process itself is necessary. I have generally found it appropriate to recycle a significant amount of bacteria to synergistically increase the phosphorus up-take activity of the original influent stream. Generally, the amount of bacteria recycled is based upon the desire to recycle bacteria at least once and probably twice or more through the system to attain adequate levels of anticipation by the bacteria. I have generally found it appropriate to continually mix the recycled bacteria laden sludge with the influent to maximize the efficiency of the process. Static and active mixers, as described for use in the previous paragraphs, have been found appropriate for such use.

Holding of the intimately mixed process streams can be achieved by multiple means. Generally it is adequate to hold the mixed stream in a large vessel sufficient to avoid a significant flow which could disrupt the gradual setting of the aqueous biomass. Generally, a detention time of about one hour or more is appropriate to obtain adequate separation of the biomass to form the activated sludge and to achieve a substantially clear, phosphorus free supernatant. The holding means can be by continuous or batch processing means but generally a continuous process in preferred. In such latter situations, weirs and baffles are incorporated into the vessel to assure efficient settling from the supernatant liquid prior to migration from the holding vessel.

Precipitants are not typically necessary for efficient operation of the process, but if desired they may be added at any point in the process. Generally they are preferrably added at the point of mixing of the separate streams or during the holding period. The prior art is replete with various precipitants that may be utilized and such is meant to be incorporated into my process.

Stressed and enhanced bacteria can be obtained at any point after the separate streams are mixed after flowing from the aerobic and anaerobic zones. A most preferred recycle sludge, however, is aged sludge from the holding tank.

The FIGURE is a flow diagram representing a sewage treatment process of the invention.

With reference to the FIGURE a raw sewage stream is typically introduced into the process at optional primary settling zone 1. This zone acts as a settlement station for easily settled heavy material such as sand, grit and the like which are typically removed from the raw sewage prior to treatment.

After appropriate settling of heavy material the raw, phosphorus containing, sewage stream to be treated by the process of this invention is intimately mixed in mixing zone 2, with a charge of previously stressed and enhanced bacteria supplied from holding zone 6. The intimately mixed raw sewage stream is divided into separate streams A and B, with stream A flowing to aerobic zone 3 and stream B flowing to anaerobic zone 4. After an appropriate reaction time the aerobically treated stream is recombined with the anaerobically treated stream at mixing zone 5 and the combined stream A/B is held in holding zone 6 to allow separation of the biomass. A clear supernatant is withdrawn from the top of holding zone 6 and may be directly discharged to an appropriate receiving facility with or without optional chlorination or the like.

The heavy sludge is withdrawn from the bottom and typically goes to concentration zone 7 and thereafter is subjected to compaction or other processing for land fill. A portion of the sludge is withdrawn and recycled to the influent for mixing in zone 2. The supernatant liquid from sludge concentration zone 7 can be optionally recycled to the aqueous influent for treatment.

The following examples are provided to explain the invention and are not meant to comprise a limitation thereto.

EXAMPLES

Primary treated, biodegradable solids containing, raw sewage inflowing at an average rate of about 27.2 million gallons per day, and containing an average about 4.50 ppm of phosphorus is intimately mixed, by means of subsurface impeller mixers, with recycled sludge containing previous anaerobically stressed and aerobically enhanced bacteria. The mixed process stream was divided into two separate streams of approximately equal volume. The first stream was fed to an aerobic chamber wherein it was aerated to an excess of oxygen above 5 ppm and maintained with a continuous flow. The second stream was fed to an anaerobic chamber wherein it was maintained in an oxygen deficient atmosphere of less than about 1 ppm of oxygen with a continuous flow. Both streams were maintained in their respective aerobic and anaerobic chambers for approximately one hour, were then recombined and intimately mixed by means of a subsurface aeration. The recombined and intimately mixed stream was then passed to a settling tank where clarified waste effluent, containing less than about 0.8 ppm phosphorus was discharged from the effluent overflow. The settled mixture of sludge was substantially aerobic at the interface with the supernatant and contained a very low concentration of soluble phosphorus. The lower portion of the sludge was a mixture of aerobic and facultative bacteria which were phosphorus enriched. The phosphorus enriched lower portion of the sludge was then chemically treated with ferrous sulphate. A portion of this sludge was concentrated and removed to a land fill. A second portion of this sludge was recycled to the influent primary treated stream. The average amount of ferrous ion required in the precipitant process to attain an effluent discharge of less than about 0.8 ppm phosphorus was about 0.14 pounds per pounds of phosphorus removed.

In a comparison with the process of the invention primary treated, biodegradable solids containing, raw sewage inflowing at an average rate of about 27.2 million gallons per day and containing about 4.50 ppm of phosphorus was intimately mixed with previously aerobically treated bacterial and facultative bacteria which were phosphorus enriched. The mixed stream was fed to an aerobic chamber wherein it was aerated to an excess of oxygen above 5 ppm for about one hour. The exiting stream was intimately mixed by means of subsurface aeration and was then passed to a settling tank where clarified waste effluent, containing less than about 0.8 ppm phosphorus was discharged from the effluent overflow. The phosphorus enriched lower portion was chemically treated with ferrous sulphate. A portion of the sludge was recycled to the influent primary treated stream. The average amount of ferrous ion required in the precipitation process to attain an effluent discharge of less than about 0.8 ppm phosphorus was 0.44 pounds of ferrous ion for each pound of phosphorus removed.

I claim:

1. A process for the treatment of an aqueous influent stream containing bacteria, phosphorus and biodegradable substrates, comprising adding to said stream aerobically enhanced and anaerobically stressed bacteria; dividing said influent stream into at least two separate streams; treating at least one of said separate streams in an aerobic zone in the presence of sufficient oxygen and for a time sufficient to cause the bacteria contained in the stream to take-up phosphorus in excess of their growth requirement; treating another of said separate streams in an anaerobic zone, under oxygen deficient conditions, for a time sufficient to stress the bacteria contained therein and cause release of phosphorus held by the bacteria; intimately mixing at least a part of the aerobically and anaerobically treated streams; holding said intimately mixed streams for a time sufficient to attain separation of bacteria containing solids from the aqueous stream; removing low bacteria and phosphorus solids content effluent from the held stream; removing high solids containing sludge from the held stream; and, recycling at least a portion of anaerobically stressed and aerobically enhanced bacteria containing sludge from said held stream to said aqueous influent stream.

2. The process of claim 1 wherein the recycled sludge is intimately mixed with the influent stream prior to dividing said stream.

3. The process of claim 1 wherein chemical precipitants are added.

4. The process of claim 3 wherein chemical precipitants are added during separation.

5. The process of claim 1 wherein the intimately mixed anaerobically and aerobically treated streams are held in a clarifier and subjected to gravimetric separation.

6. The process of claim 1 wherein the influent stream is divided into two separate streams.

7. The process of claim 6 wherein the two streams are concurrently treated.

8. The process of claim 1 when the influent stream is subjected to primary heavy solids separation prior to aerobic and anaerobic treatment.

9. The process of claim 8 wherein the anaerobic stressed and anaerobic enhanced bacteria are added to said influent stream prior to heavy solids separation.

10. The process of claim 1 wherein the anaerobic stressed and aerobic enhanced bacteria is added to the divided influent stream.

11. The process of claim 1 where said aerobic zone comprises more than about 3 ppm of oxygen.

12. The process of claim 1 wherein the treatment in said anaerobic zone includes the addition of a precipitant.

13. The process of claim 1 wherein the high solids containing sludge is concentrated.

14. The process of claim 13 wherein a supernatant liquid from the sludge concentration is recyled to the aqueous influent stream.

15. The process of claim 13 wherein chemical precipitants are added during sludge concentration.

* * * * *